United States Patent [19]

Takiyama et al.

[11] Patent Number: 4,734,469

[45] Date of Patent: Mar. 29, 1988

[54] CURABLE RESINS WHICH ARE REACTION PRODUCTS OF BISPHENOL DIGLYCIDYLETHER TYPE EPOXY RESINS AND (METH)ACRYLIC ACID AND PROCESS FOR PREPARING SAME

[75] Inventors: Eiichiro Takiyama, Kamakura; Katsuhisa Morita, Takasaki, both of Japan

[73] Assignee: Showa Highpower Co. Ltd., Tokyo, Japan

[21] Appl. No.: 862,508

[22] Filed: May 12, 1986

[30] Foreign Application Priority Data

May 14, 1985 [JP] Japan .................................. 60-100533

[51] Int. Cl.[4] .................. C08F 283/00; C08F 283/10; C08F 224/00
[52] U.S. Cl. .................................. 525/529; 525/531; 526/266
[58] Field of Search ................. 525/530, 65, 112, 531, 525/266, 529; 526/273

[56] References Cited

U.S. PATENT DOCUMENTS

| | | | |
|---|---|---|---|
| 3,663,484 | 5/1972 | Broecker et al. | 525/530 |
| 3,819,567 | 6/1974 | Swanson et al. | 525/530 |
| 4,111,770 | 9/1978 | Najvar | 525/531 |
| 4,209,604 | 6/1980 | Werber | 526/273 |
| 4,446,258 | 5/1984 | Chu et al. | 525/65 |
| 4,698,841 | 7/1978 | Nagata et al. | 525/530 |

*Primary Examiner*—Joseph L. Schofer
*Assistant Examiner*—Peter F. Kulkosky
*Attorney, Agent, or Firm*—Tilton, Fallon, Lungmus & Chestnut

[57] ABSTRACT

A curable copolymer is provided wherein an unsaturated epoxy resin is prepared by reacting epoxy resin and acrylic and/or methacrylic acid, said unsaturated epoxy resin containing both a epoxy group and acryloyl and/or methacryloyl groups, with which a vinyl monomer is reacted in the presence of a radical catalyst to form an epoxy resin side chain. The resultant resin is finally reacted with acrylic and/or methacrylic acid to react with the remaining epoxy resin thereby resulting in terminal acryloyl and/or methacryloyl groups. This resin can be used as coating paint or molding resin or for a variety of other uses.

11 Claims, No Drawings

CURABLE RESINS WHICH ARE REACTION PRODUCTS OF BISPHENOL DIGLYCIDYLETHER TYPE EPOXY RESINS AND (METH)ACRYLIC ACID AND PROCESS FOR PREPARING SAME

BACKGROUND OF THE INVENTION

The present invention relates to a curable resin, and more particularly, it relates to a radically curable resin having a variety of uses, said resin having a pendanted bisphenol diglycidylether type epoxy resin with a polymerizable terminal acryloyl or methacryloyl group. For simplicities sake only, the acryloyl or methacryloyl group will hereinafter be referred to collectively as a (metha)acryloyl group. The present invention also relates to a process for preparing said resin.

Radically curable resins are currently typified by unsaturated polyester resins and vinylester resins, and diallylphthalate resins are also employed as molding material, decorative material and the like.

Each of these resins are appropriately used depending upon their characteristcs and physical properties and are very useful for their respective applications.

However, there are many points for improving the defects present in these resins when they are applied to each of a variety of uses or to any application which demand novel characterics. For example, although vinylester resins exhibit outstanding water-resistance and resistance to chemical agents and are thus employed in large amounts as corrosion resistant FRP and corrosion resistant flake-linings, the production of molding material or of fiber-based prepreg or the provision of useful shaped products from vinylester resins is difficult at present. This is because it is difficult to apply them depending according to pplications for the production of molding material or prepreg due to the fact that vinylesters have a molecular weight of only several hundred to approximately 2000, corresponding to at most oligomers/prepolymers. Thus it is necessary to increase their molecular weight by any means.

From the reasons set forth above, vinylester resins, by way of example, are generally employed in combination with a diisocyanate to react the latter with the hydroxy groups in the former to increase the molecular weight resulting in a thickening of viscosity.

However, this procedure makes it difficult, as a general trend, to consistently obtain the constant viscosity, fluidity, and moldability of the product and thus results in severe fluctuation therein. Moreover, the above procedure may give rise to chemical cross-linking reactions which make it difficult to mold the resultant product. This is an effective reason for inhibiting the widespread use of the resins.

On the other hand, it is only recently that it has become possible to control the thickness of unsaturated polyesters by the formation of metal cross-linkages between the terminal carboxyl groups in said unsaturated polyesters and magnesium oxide resulting from the combined use of unsaturated polyesters and an oxide of divalent metals such as magnesia. However, some fluctuations in moldability still remained and further, the use of alkaline metal oxides may occasionally be disagreeable for some applications such as those demanding high electrical properties.

SUMMARY OF THE INVENTION

The object of the present invention is to provide a novel radically curable resin which considerably reduces the defects of the prior art resins set forth above.

The inventors have found that resins having pendant groups expressed by the formula set forth below can remedy a substantial part of the defects of the prior art resins, thus completing the present invention.

Accordingly, the present invention aims to provide a curable copolymer of vinyl monomers and acryloyl- or methacryloyl-containing monomers which has pendant groups from the copolymer backbone chain with the following formula:

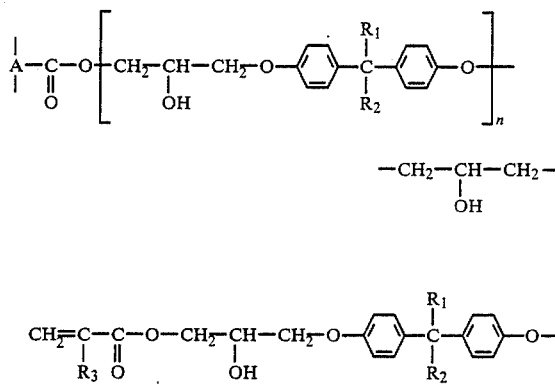

wherein A represents a backbone chain of copolymer resin consisting of copolymerized vinyl monomers and (metha)acryloyl-containing monomers, where $R_1$, $R_2$, and $R_3$, each represent a hydrogen or a methyl group, and n represents an integer of from 0 to 5.

Further, the present invention is for providing a process for preparing a curable copolymer resin having the above-mentioned formula in which,

[A] a polymer-containing reaction mixture is prepared by copolymerizing:

a component (1) which contains as at least one component an unsaturated epoxy resin having (metha)acryloyl group and an epoxy group in the molecule resulting from reacting acrylic or methacrylic acid [hereinafter simply referred to as (metha)acrylic acid] and bisphenol diglycidylether type epoxy resin, said bisphenpol digycidylether type epoxy resin being obtained from bisphenol and epichlorhydrin; and a vinylmonomer (2)

in the presence of a radical polymerization catalyst to form the polymer-containing reaction mixture, said polymer containing in its side chain bisphenol diglycidylether type epoxy groups, and then

[B] adding to the reaction mixture resulting from the step [A] an amount of (metha)acrylic acid substantially equimolar to the epoxy group remaining in said reaction mixture to react the epoxy group and the carboxyl group.

DETAILED DESCRIPTION OF THE INVENTION

A typical example of an unsaturated epoxy resin resulting from the step [A] can be exemplified as follows:

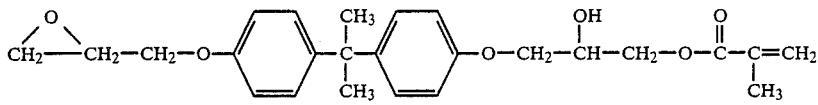

[unsaturated epoxy resin (A)]

The reaction between the epoxy resin and (metha)acrylic acid in an equi-equivalent ratio of the reactants does not proceed to 100% formation of the unsaturated epoxy resin (A), but it also produces di(metha)acrylate with an unreacted epoxy resin. Thus the net reaction products further include the following mixture:

The presence of unreacted epoxy resin (C) remaining from the reaction will the (metha)acrylic acid upon the formation of the unsaturated epoxy resin can later be effectively modified by adding thereto (metha)acryloyl groups, thereby serving to improve the physical properties of the cured products depending upon use.

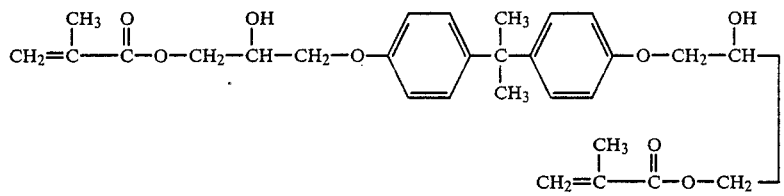

vinylester resin (B)

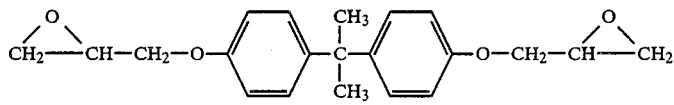

epoxy resin (C)

Among these components, the component (B), even if formed in slight amounts, forms a gel due to the cross-linkage upon copolymerization of the component (1) and component (2), vinylester resin, thus preventing the succesfull formation of the reaction mixture in step [A].

OBJECT OF THE PRESENT INVENTION

To prevent the formation of the vinylester resin (B), it is necessary to use epoxy resin in molar execess to (metha)acrylic acid and therefore, the unsaturated epoxy resin according to the present invention naturally becomes a mixture of unsaturated epoxy resin (A) and epoxy resin (C). This is the reason why the component (1) is herein defined as one containing an unsaturated epoxy resin as at least one component.

The one important characteristic of the present invention resides in the discovery that upon copolymerizing the unsaturated epoxy resin which naturally contains an unreacted epoxy resin, i.e. component (1), with the vinyl monomer, i.e. the component (2), in the presence of a radical catalyst, the epoxy group in the unsaturated epoxy resin does not participate to the copolymerization reaction, thus permitting the copolymerization of the (metha)acryloyl group with the vinyl group to form a copolimerized polymer having a side chain of a bisphenol type glycidylether type epoxy group.

The process for producing the resin of the present invention will be outlined hereinafter.

(i) Firstly, the unsaturated epoxy resin (A) is prepared by reacting a predetermined amount of (metha)acrylic acid with an excess amount in equivalent ratio of epoxy resin in the presence of a required reaction catalyst such as tertiary amine, amine salt, quarternary ammonium salt, or metal salt, (ii) To the resultant unsaturated epoxy resin is added the required kind and amount of vinyl monomer and the radical catalyst or initiator such as azobisisobutyronitrile, then allowing the radical copolymerization of the (metha)acryloyl group in the unsaturated epoxy resin (A) and the vinyl monomer in the presence of said catalyst to form the polymer-containing reaction mixture, said polymer having an epoxy group in its side chain, (iii) To the resultant polymer-containing reaction mixture the required amount of (metha)acrylic acid is further added to react the epoxy group remaining in the reaction mixture and carboxyl group to form the desired polymer having a vinylester group side chain.

The epoxy resin which can be used in the present invention is an polyaddition homologue of phenylglycidyl-ether type prepared from bisphenol and epichlorhydrin which is a typically represented by the following formula:

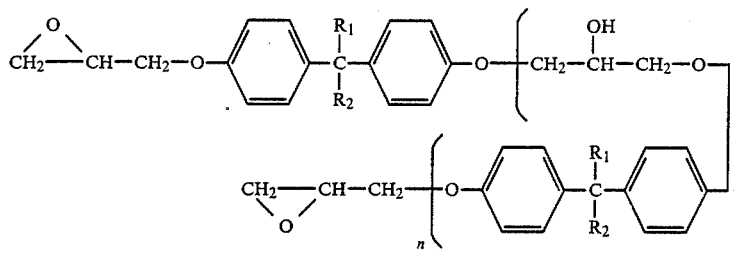

wherein n=0 to 5 and $R_1$ and $R_2$ are hydrogen or methyl group.

The epoxy resin preferred in the present invention is one in which n is in the approximate range of from 0 to 3.

The ratio of (metha)acrylic acid to the epoxy resin having two or more glycidylether type epoxy groups upon preparing the unsaturated epoxy resin is such that more than one molar amount of epoxy resin is used per one mole of (metha)acrylic acid i.e. per one equivalent carboxyl group, if the epoxy resin contains two epoxy groups in one molecule and that more than onemolar amount of epoxy resin per one mole of acrylic acid, the epoxy group shoud thus be present in excess of 2 equivalents per one equivqlent carboxyl group.

As to the vinyl monomer for constituting the polymer backbone chain in combination with the unsaturated epoxy resin, any vinyl monomer can be used provided that it is copolymerizable with the (metha)acryloyl group.

Typical examples of these vinyl monomers are styrene, vinyltoluene, chlorostyrene, methyl acrylate, ethyl acrylate, n-butyl acrylate, isobutyl acrylate, t-butyl acrylate, 2-ethylhexyl acrylate, methyl methacrylate, ethyl methacrylate, n-butyl methacrylate, isobutyl methacrylate, t-butyl methacrylate, 2-ethylhexyl methacrylate, lauryl methacrylate, cyclohexyl methacrylate, benzyl methacrylate, tetrahydrofurfryl methacrylate, acrylonitrile, vinyl acetate, vinyl propionate, vinylidene chloride, vinyl chloride and the like.

The copolymerization in step [A] can be carried out by bulk polymerization, solution polymerization, pearl polymerization and the like. The solution polymerization technique has an advantage that the product from the solution polymerization as such can be used in the subsequent reaction with (metha)acrylic acid in step [B].

When the copolymerization is carried out by pearl polymerization or bulk polimerization, the resultant copolymer is then dissolved in a monomer or solvent followed by the reaction between (metha)acrylic acid and epoxy groups in the copolymer in step [B].

In copolymerization of the unsaturated epoxy resin and vinyl monomer, a kown radical polymerization catalyst such as organic peroxide, azo compound and the like may be used.

The ratio of the (metha)acryloyl groups and the vinyl monomer can be widely varied in the range of 99 to 1 molar % of the vinyl monomer. Though this ratio can be changed depending upon use, the vinyl monomer may generally be employed in the range of 95 to 50 molar %.

The amount of (metha)acylic acid added to the copolymer resultant from the step [A] relative to the epoxy groups remaining in the reaction mixture which contains bisphenol type diglycidylether type epoxy group-containing copolymer for the purpose of reacting the carboxyl group in said added (metha)acrylic acid with the remaining epoxy groups is preferably such that substantially all of the remaining epoxy groups can be reacted, although the amount of acid used should be varied depending upon the amount of the epoxy resin used in the step [A] with 0.9 to 1.1 equivalent per 1 equivalent epoxy group remained to be reacted, 0.95 to 1.05 equivalent of (metha)acrylic acid being more preferable.

The curable copolymer resin according to the present invention can be cured by dissolving the copolymer into an monomer and curing therewith. Alternatively, it can be cured by cross-linkage of the unsaturated linkages in the copolymer with each other, without addition of a monomer.

As typical examples of the monomer, there may be mentioned styrene, vinyltoluene, chlorostyrene, methyl acrylate, ethyl acrylate, n-butyl acrylate, isobutyl acrylate, t-butyl acrylate, 2-ethylhexyl acrylate, methyl methacrylate, ethyl methacrylate, n-butyl methacrylate, isobutyl methacrylate, t-butyl methacrylate, 2-ethylhexyl methacrylate, lauryl methacrylate, cyclohexyl methacrylate, benzyl methacrylate, tetrafurfuryl methacrylate, vinyl acetate, vinyl propionate and the like.

The resin according to the present invention can be used over a wide range of applications such as in making FRP, laminated plates, adhesives, molding material and the like with the incorporation of fillers, reinforcing agents, release agents, coloring agents, curing agents, accelerators, stabilizers and the like.

The following examples will illustrate more fully the present invention.

EXAMPLE 1

Preparation of unsaturated epoxy resin (a)

To 1 l separable flask equipped with a stirrer, a gas inlet tube with inserted thermometer, a reflux condenser and a dropping funnel, 360 g (1 mole) of Epikote 827 (trade name of Mitsubishi Yuka-Shell Co.) as the epoxy resin, 43 g (0.5 mole) of methacrylic acid, 1.2 g of benzyldimethylamine, and 0.08 g of parabenzoquinon were charged and the resulting mixture was reacted together at 120° to 130° C. for 3 hours while being blown through with nitrogen gas. At the end of this period the acid value became nearly zero and the unsaturated epoxy resin (a) yielded a pale reddish brown colored syrup. The resin (a) was a mixture of the 223 g of unsaturated epoxy resin having the formula [I] below:

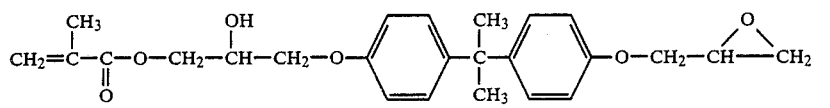

and 180 g of unreacted free epoxy resin.

Preparation of copolymer (b) having side chain epoxy resin

To a flask similar to the directly preceding paragraph, 250 g of methylethyl ketone, 173 g (0.2 mole) of unsaturated epoxy resin (a), 100 g of styrene and 3.5 g azobisisobutyronitrile were charged and 87 g (total amount of styrene is 1.8 moles) of styrene was further added dropwise at 75° C. under blowing nitrogen gas to the flask.

After 6 hours 2 g of azobisisobutyronitrile was further added and copolymerization was continued for a further 10 hours.

When the copolymerization rate was found to be 96%, the reaction was stopped with the addition of 0.2 g of hydroquinon. Thus a copolymer was obtained copolymer having a side chain epoxy resin (b) in the form of a pale yellowish brown methylethyl ketone solution (solid content of 40%).

GPC analysis shows that the resultant product was a mixture of a polymer having a peak molecular weight of 50,000 and an unreacted epoxy resin.

Preparation of copolymer having vinyl ester side chains (A)

To a methylethyl ketone solution of the copolymer having epoxy resin side chains (b) set forth above 52 g (0.60 mole) of methacrylic acid, and 0.8 g triphenylphosphine were charged and reacted together at the boiling point of methylethyl ketone for 16 hours. At the end of this period, the acid value became 10.4 and then 420 g of styrene monomer was added, after which methylethyl ketone was distilled of at the reduced pressure of 400 to 450 mmHg.

As a result of gas chromatography of the reaction mixture which required 6 hours it was found that the amount of methylethyl ketone decreased to 0.3% and at this point the heating of the reaction mixture was stopped. The copolymer having vinyl ester side chains [A] was recovered as a yellowish brown liquid, the viscosity of which was 1.9 poise at ordinary temperature.

The following composition was prepared and subjected to physical tests:
copolymer having vinyl ester side chains [A]: 100 parts
PERCURE (Nippon Yushi Co.) (peroxide catalyst): 1 part
cobalt naphtenate (6% Co): 0.5 part
The composition was gelled at room temperature for 11 minutes with the shortest cure time of 11.4 minutes and the maximum exotherm temperature of 175° C. The physical properties were indicated as below:
tensile strength (kg/mm$_2$): 6.9-7.4
bending strength (kg/mm$_2$): 13.7-15.9
bending modulus of elasticity (kg/mm$_2$): 322-369
heat distortion temperature (°C.): 124

EXAMPLE 2

Preparation of unsaturated epoxy resin (c)

To a 2 l separable flask equipped with a stirrer, a gas inlet tube with inserted thermometer, a dropping funnel, and a reflux condenser, 72 g (1 mole) of acrylic acid, 228 g (1 mole) of bisphenole A, 850 g (2.5 moles) of epoxy resin (ASAHI-DOW #332), 4 g triphenylphosphine, and 0.4 g of t-butylhydroquinon were charged and reacted together at 120°-130° C. for 4 hours to yield a yellowish brown liquid, unsaturated epoxy resin (c) having an acid vaslue of 8.1, and softening point of 40° C.

Preparation of copolymer having epoxy resin side chain (d)

To a 3 l four-necked flask equipped with a stirrer, a reflux condenser, a thermometer, and a gas inlet tube, 600 g of the unsaturated epoxy resin (c), 200 g of ethyl acrylate, 260 g styrene, 10 g azoisobutyronitrile, and 800 g of methylethyl ketone were charged and reacted together for 16 hours under reflux of methylethyl ketone and flow of nitrogen to result in a polymerization rate of 94%.

After addition of 0.5 g of hydroquinon, the reaction was ceased. The copolymer having epoxy side chains (d) was obtained in the form of a thick yellowish brown liquid.

Preparation of copolymer having vinylester side chains (B)

To the whole amount of the copolymer having side epoxy resin chain (d), 72 g (1 mole) of acrylic acid and an additiona 2 g of triphenylphosphine was added and the resultant mixture was reacted together at methylethyl ketone boiling temperature for 26 hours to result in an acid value of 1.4 and it was confirmed that the epoxy group disappeared. The methylethyl ketone solution of copolymer hving vinylester side chains (B) was yellowish brown, the viscosity of which was approximately 30 poises.

To 100 parts of the copolymer hving vinylester side chains (B), one part of 'DAROCURE' #1173 (Merk Co.), 10 parts of hexanediole diacrylate were added and the resultant mixture was coated 0.1 mm thick on a bonderized steel plate with a bar coater. After the removal of methylethyl ketone by allowing it to stand for 2 hours at 50° C., the coated plate was passed under an ultraviolet radiation lamp of 2 kw output 10 cm apart from the lamp and at a 2 m/min. conveyer speed. The properties of the resultant film were as indicated below:
pencil hardness: 2-3H
film adhesiveness:
  cross cut test: pass
  cross cut adhesion test: 100/100

From the above result it can be seen that the resin according to the invention can be used as a paint.

What is claimed is:

1. A curable copolymer resin of vinyl monomers and acryloyl- or methacryloyl-containing monomers which has pendant groups from the copolymer backbone chain with the following formula:

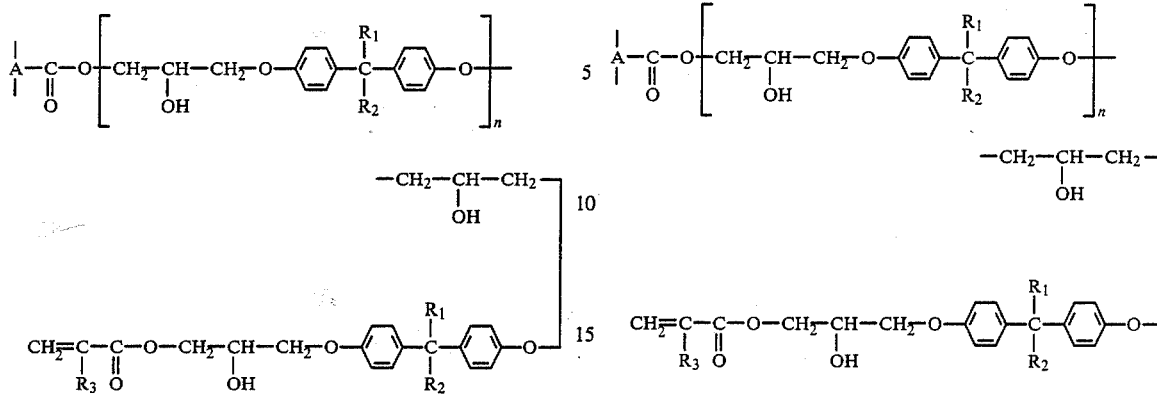

wherein A represents a backbone chain of copolymer resin consisting of copolymerized vinyl monomers and acryloyl- or methacryloyl-containing monomers, where $R_1$, $R_2$, and $R_3$, each represent a hydrogen or a methyl group, and n represents an integer of from 0 to 5.

2. A curable copolymer resin according to claim 1 wherein the backbone chain A comprises a moiety resulting from styrene, vinyl toluene, chlorostyrene, methyl acrylate, ethyl acrylate, n-butyl acrylate, isobutyl acrylate, t-butyl acrylate, 2-ethylhexyl acrylate, methyl methacrylate, ethy methacrylate, n-butyl methacrylate, isobutyl methacrylate, t-butyl methacrylate, 2-ethylhexyl methacrylate, lauryl methacrylate, cyclohexyl methacrylate, benzyl methacrylate, tetrafurfuryl methacrylate, acrylonitrile, vinyl acetate, vinyl propionate, vinylidene chloride, or vinyl chloride copolymerized with acryloyl and/or methacryloyl group.

3. A curable copolymer resin according claim 1, wherein the proportion of vinyl monomer moiety in the backbone chain A comprises 99 to 1 mole % based on the sum of vinylmonomer and acryloyl and/or methacryloyl moieties.

4. Curable copolymer resin according to claim 3 wherein the proportion of vinyl moiety comprises 95 to 5 mole % of the total of the vinyl moiety and acrylic and/or methacrylic moiety.

5. A curable copolymer resin according to claim 1 wherein said resin is dissolved in a copolymerizable monomer.

6. A curable copolymer resin according to claim 1 wherein said copolymerizable monomer is selected from styrene, vinyl toluene, chlorostyrene, methyl acrylate, ethyl acrylate, n-butyl acrylate, isobutyl acrylate, t-butyl acrylate, 2-ethylhexyl acrylate, methyl methacrylate, ethy methacrylate, n-butyl methacrylate, isobutyl methacrylate, t-butyl methacrylate, 2-ethylhexyl methacrylate, lauryl methacrylate, cyclohexyl methacrylate, benzyl methacrylate, tetafurfuryl methacrylate, acrylonitrile, vinyl acetate, vinyl propionate, vinylidene chloride, or vinyl chloride.

7. A process for preparing a curable copolymer resin having the formula:

wherein A represents a backbone chain of copolymer resin consisting of copolymerized vinyl monomers and acryloyl- or methacryloyl-containing monomers, where $R_1$, $R_2$, and $R_3$, each represent a hydrogen or a methyl group, and n represents an integer of from 0 to 5, comprising

[A] preparing a polymer-containing reaction mixture by copolymerizing a component (1) which contains as at least one component as unsaturated epoxy resin having (metha)acryloyl group and an epoxy group in the molecule resulting from reacting acrylic or methacrylic acid and bisphenol diglycidylether type epoxy resin in the presence of an esterification catalyst, wherein a carboxylic group of said acid exists in an amount of 25–50% equivalent based on the equivalent of an epoxide group of said bisphenol diglycidylether type epoxy resin and said bisphenol diglycidylether type epoxy resin is obtained from bisphenol and epichlorhydrin; and a vinylmonomer (2) in the presence of a radical polymerization catalyst to form the polymer-containing reaction mixture, said polymer containing in its side chain bisphenol diglycidylether type epoxy groups, and then

[B] adding to the reaction mixture resulting from step [A] an amount of (metha)acrylic acid substantially equimolar to the epoxy group remaining in said reaction mixture to react the epoxy group and the carboxyl group.

8. A process according to claim 7 wherein the vinyl monomer is selected from styrene, vinyl toluene, chlorostyrene, methyl acrylate, ethyl acrylate, n-butyl acrylate, isobutyl acrylate, t-butyl acrylate, 2-ethylhexyl acrylate, methyl methacrylate, ethy methacrylate, n-butyl methacrylate, isobutyl methacrylate, t-butyl methacrylate, 2-ethylhexyl methacrylate, lauryl methacrylate, cyclohexyl methacrylate, benzyl methacrylate, tetrafurfuryl methacrylate, acrylonitrile, vinyl acetate, vinyl propionate, vinylidene chloride, or vinyl chloride.

9. A process according to claim 7 wherein the proportion of the vinyl monomer relative to the whole of the vinyl monomer plus acrylic and/or methacrylic acid is 1 to 99 molar %.

10. A process according to claim 9 wherein the proportion of vinyl monomer is 95 to 50 molar %.

11. A process according to claim 7 wherein the ratio of acrylic and/or methacrylic acid in the step [B] is 0.9 to 1.1 equivalent acrylic and/or methacrylic acid per 1 equivalent epoxy group.

* * * * *